United States Patent [19]
Christophliemk et al.

[11] 4,055,622
[45] Oct. 25, 1977

[54] PROCESS FOR THE PRODUCTION OF ZEOLITIC ALKALI METAL ALUMINOSILICATES

[75] Inventors: Peter Christophliemk, Dusseldorf; Wolfgang Friedemann, Neuss; Ernst Vaeth; Karl-Heinz Worms, both of Dusseldorf, all of Germany

[73] Assignees: Henkel Kommanditgesellschaft auf Aktien, Dusseldorf-Holthausen; Deutsche Gold- und Silber-Scheideanstalt vormals Roessler, Frankfurt am Main, both of Germany

[21] Appl. No.: 705,791

[22] Filed: July 16, 1976

[30] Foreign Application Priority Data

July 26, 1975 Germany .............................. 2533614

[51] Int. Cl.$^2$ .................................................. C01B 33/28
[52] U.S. Cl. ................................... 423/118; 423/329; 423/330
[58] Field of Search .................... 423/118, 328–330; 252/455 Z

[56] References Cited

U.S. PATENT DOCUMENTS

| 2,882,243 | 4/1959 | Milton .................................. 423/328 |
| 2,882,244 | 4/1959 | Milton .................................. 423/328 |
| 3,639,099 | 1/1972 | Elliott et al. ......................... 423/329 |
| 3,671,191 | 6/1972 | Maher et al. ......................... 423/328 |

*Primary Examiner*—Edward J. Meros
*Attorney, Agent, or Firm*—Hammond & Littell

[57] ABSTRACT

A process for the production of zeolitic alkali metal aluminosilicates by the reaction of aqueous alkali metal silicate solutions with an aqueous alkali metal aluminate solution containing sulfate anions at temperatures of 0° C to 110° C under a shearing type of agitation and conversion of the amorphous precipitate to crystalline forms by maintaining an aqueous suspension of the amorphous form at temperatures of 40° C or over for a time sufficient to effect crystallization, whereby formation of substantial amounts of inactive nosean are avoided.

8 Claims, No Drawings

4,055,622

PROCESS FOR THE PRODUCTION OF ZEOLITIC ALKALI METAL ALUMINOSILICATES

THE RELATED ART

The preparation of zeolitic alkali metal aluminosilicates is known in which aqueous alkali metal silicate and alkali metal aluminate solutions are reacted at precipitation temperatures in the range from 0° C to 110° C, are subsequently acted on by shearing forces and the precipitated amorphous alkali metal aluminosilicates are converted to crystalline form by heating at elevated temperatures. The copending, commonly assigned U.S. patent application Ser. No. 458,306, filed Apr. 5, 1974, gives details of such a method.

The synthetic zeolites formed in such processes may be used as catalysts in chemical processes, owing to their molecular sieve properties, as drying or adsorption agents for solvents and gases or as heterogeneous inorganic building substances in washing and cleaning agents. For washing and cleaning processes, zeolitic alkali metal aluminosilicates of the Faujasite group, such as Type A and Type X, are suitable, provided these have a sufficient capacity for binding alkaline earth metals. The molecular proportions of alkali metal, aluminum and silicon are usually given as oxides.

Molecular sieves of Type A have the summation formula of

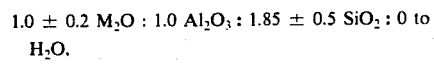

while molecular sieves of Type X have the silicate-richer composition

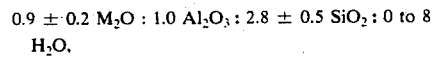

where M represents an alkali metal cation in each case. It is customary to make the molecular sieve first in its sodium form. Since, in the literature, very varied nomenclature and symbols are used for the above-mentioned alkali metal aluminosilicates Types A and X, it is expedient to utilize the X-ray diffraction diagrams for the characterization of the zeolites which are chemically relatively similar to one another. The X-ray diffraction diagram of molecular sieve type A is described, for example, in German Auslegeschrift Nos. 1,038,015 and 1,038,017, and the X-ray diffraction diagram of molecular sieve Type X is described in German Auslegeschrift No. 1,038,016.

In the aluminum processing industry, large quantities of so-called aluminate residues are formed during the production of clean aluminum surfaces by pickling with alkaline solutions. In spite of their high aluminum content, these pickling residues have not previously had much use on account of their impurities. On the other hand, the required neutralization and the subsequent separation and deposition involve high costs, since it is not allowable to pass unneutralized pickling liquors into the sewers. The impurities hitherto preventing the utilization of pickling residues are produced especially by neutralization or partial neutralization with sulfuric acid or by additives which are intended to prevent the formation of a solid "aluminate stone" which is almost totally insoluble in acids and alkalis. Thus a slurry precipitated from alkaline pickling liquors by addition of sulfuric acid may contain up to 50% of sodium sulfate in the dry residue.

OBJECTS OF THE INVENTION

An object of the present invention is the development of a process for the manufacture of zeolitic alkali metal aluminosilicates by the reaction of aqueous alkali metal silicate and alkali metal aluminate solutions, wherein the alkali metal aluminate solutions have a large content of alkali metal sulfate.

Another object of the present invention is the development of a process for the production of zeolitic alkali metal aluminosilicates from alkali metal aluminate solutions containing alkali metal sulfate impurities consisting essentially of the steps of a. mixing an aqueous alkali metal silicate solution with an aqueous alkali metal aluminate solution 1. containing an alkali metal sulfate having a molar ratio of $Al_2O_3$ to sulfate of 1:0.35 to 1.25 under agitation at a precipitation temperature of from 0° C to 110° C, 2. in such amounts that the resulting mixture has a molar ratio of alkali metal oxide : $Al_2O_3$ : $SiO_2$ of 1.5 to 6.0:1.0:1 to 5.0, wherein 3. the alkali metal oxide is present in a stoichiometric excess with respect to $SiO_2$, 4. the excess of alkali metal oxide over unity as well as the alkali metal oxide concentration is decreased when the sulfate content is increased, and 5. the alkali metal oxide : $Al_2O_3$ : $SiO_2$ solids content of the resultant aqueous mixture is maintained between 10% to 40% by weight, b. subjecting the aqueous precipitate to a homogenization by application of shearing forces, c. converting the amorphous homogenized slurry to a crystalline state by maintaining the slurry at a crystallization temperature of between about 40° C and 120° C, d. determining the calcium binding power of the crystalline aluminosilicate formed, and e. (6) discontinuing the conversion step (c) by cooling and separating the crystalline aluminosilicate when substantially the optimum calcium binding power is attained.

These and other objects of the invention will become more apparent as the description thereof proceeds.

DESCRIPTION OF THE INVENTION

The new process for the production of zeolitic alkali metal aluminosilicates by reaction of aqueous alkali metal silicate and alkali metal aluminate solutions at precipitation temperatures in the range from 0° C to 110° C, subsequent action of shearing forces and crystallization of the precipitated amorphous alkali metal aluminosilicates at elevated temperature is characterized in that:

1. the alkali metal aluminate solutions contain alkali metal sulfate in an amount of from 0.35 to 1.25 the molar amount of $Al_2O_3$ and preferably up to equimolecular amounts with reference to $Al_2O_3$, 2. the molar proportion of alkali metal oxide : $Al_2O_3$ : $SiO_2$ in the precipitation mixture should have ratio amounts of 1.5 to 6.0:1.0:1.0 to 5; for molecular sieve Type A, it is preferably 2 to 3.5:1.0:1.0 to 3, and for molecular sieve Type X, it is preferably 3 to 6:1.0:2.5 to 5;

3. the alkali metal oxide is always present in stoichiometric excess with respect to $SiO_2$, 4. the smaller the excess of alkali metal oxide and the concentration of alkali metal oxide in the precipitation mixture, the higher is the sulfate content, 5. the active solid content in the batch amounts to 10% to 40%, preferably 12% to 30%, by weight, 6. the crystallization time does not exceed 10 hours, and preferably does not exceed 8 hours, and the shorter it is, the higher is the content of solids and sulfate in the batch, 7. the crystallization is discontinued when the optimum calcium binding capacity of the molecular sieve obtained is attained.

More particularly, therefore, the invention relates to a process for the production of zeolitic alkali metal aluminosilicates from alkali metal aluminate solutions containing alkali metal surface impurities consisting essentially of the steps of a. mixing an aqueous alkali metal silicate solution with an aqueous alkali metal aluminate solution 1. containing an alkali metal sulfate having a molar ratio of $Al_2O_3$ to sulfate of 1:0.35 to 1.25 under agitation at a precipitation temperature of from 0° C to 110° C, 2. in such amounts that the resulting mixture has a molar ratio of alkali metal oxide : $Al_2O_3$ : $SiO_2$ of 1.5 to 6.0:1.0:1 to 5.0, wherein 3. the alkali metal oxide is present in a stoichiometric excess with respect to $SiO_2$, 4. the excess of alkali metal oxide over unity as well as the alkali metal oxide concentration is decreased when the sulfate content is increased, and 5. the alkali metal oxide : $Al_2O_3$ : $SiO_2$ solids content of the resultant aqueous mixture is maintained between 10% to 40% by weight, b. subjecting the aqueous precipitate to a homogenization by application of shearing forces, c. converting the amorphous homogenized slurry to a crystalline state by maintaining the slurry at a crystallization temperature of between about 40° C and 120° C, d. determining the calcium binding power of the crystalline aluminosilicate formed, and e. (6) discontinuing the conversion step (c) by cooling and separating the crystalline aluminosilicate when substantially the optimum calcium binding power is attained.

The previously mentioned aluminate residues may be used as the alkali metal aluminate solutions with a relatively high sulfate content. Both the pickling slurry already being partly deposited from the pickling liquor during the pickling or precipitated by partial or complete neutralization and also even the liquors remaining after separation of this pickling slurry are suitable as residues of this kind.

For an economic process the aluminum concentration of the pickling residues should be as high as possible. In dried pickling slurry this lies mostly in the range of from 60% to 70% by weight of $Al_2O_3$, and in pickling liquors on the other hand, it usually only reaches about 15%. Pickling liquors with a high aluminum concentration are to be preferred for transport reasons.

The alkaline pickling liquors can be used either directly or after enrichment with other aluminum components (pickling slurry, solid alkali metal aluminate, aluminum hydroxide or the like). The pickling slurry is suitably first dissolved in strong caustic soda or caustic potash with heating. Therefore, the use of the alkaline pickling liquors is preferred.

Suitable alkali metal silicate solutions are commercial sodium or potassium silicate solutions. The molar ratio of $Na_2O$ : $SiO_2$ lies generally in the range from 1:2 to 1:3.8. The alkali metal oxide content, calculated as $Na_2O$, suitably lies in the range from 5.9% to 15% by weight and the $SiO_2$ content in the range from 18% to 37% by weight. The use of more dilute alkali metal silicate solutions is only suitable when for any reasons batches with a reduced content of solids are to be prepared. Such low solid contents, however, are generally uneconomic. The sodium silicate solutions, moreover, may be replaced partly or completely by potassium silicate solutions with the same molar proportions and reaction conditions. The molecular sieves thereby formed have largely the same properties when the stoichiometric composition is retained in which the $Na_2O$ is replaced by $K_2O$ wholly or partly depending on the ratio of $Na_2O$ in the pickling liquor to $K_2O$ in the alkali metal silicate solution.

It has been found that the sulfate content in the precipitation mixture under the conditions described below can amount to a molar ratio of from 0.35 to 1.25 with respect to $Al_2O_3$. Preferably, however, the sulfate content should be about equimolar with respect to $Al_2O_3$. This result is surprising since foreign ions, such as, for example, carbonate or the anions of the mineral acids, even in small concentrations, are very troublesome during the precipitation synthesis of zeolitic alkali metal aluminosilicates. For the preparation of nosean, when desired, sodium sulfate is used in excess.

The formation of nosean, however, is undesired here, since this compound, as a non-zeolitic feldspathic sodium aluminosilicate, has no typical molecular sieve properties or calcium binding capacity and, therefore, is also inactive, for example, as a heterogeneous inorganic builder compound. Nosean has the stoichiometric composition $$3[Na_2O . Al_2O_3 . 2 SiO_2] . Na_2SO_4$$

The molar ratio of $Na_2SO_4$ : $Al_2O_3$ is consequently 1:3. With equimolecular amounts of sodium sulfate and $Al_2O_3$ in the precipitation mixture, sodium sulfate is present in 200% excess with respect to nosean. The sulfate content of the precipitation mixtures is suitably calculated as $Na_2SO_4$ and the molar ratio $$n = Na_2SO_4 / Al_2O_3$$

refers to the amount of $Al_2O_3$ present in the alkali metal aluminate solution. With such a high excess of sulfate, all expectations support the complete formation of nosean. Experiments carried out for comparison show, in fact, that even with less than the stoichiometric amount of sulfate for nosean formation in the precipitation mixture (see Example 3), nosean or similar feldspathic substances which do not exchange ions are readily formed when the reaction proportions of the invention are not adhered to.

Even small contaminations of the product with nosean can be quickly found by the X-ray diffraction diagram, since that for nosean deviates considerably from the molecular sieve Types A and X.

In order to carry out the process, the molar ratio alkali metal oxide : $Al_2O_3$ : $SiO_2$ in the precipitation mixture is adjusted so that it lies in the range from 1.5 to 6.0:1.0:1 to 5.0. For the preparation of molecular sieve Type A, the molar ratio is preferably in the range of from 2.0 to 3.5:1.0:1.0 to 3.0, and for molecular sieve Type X, it is preferably in the range from 3.0 to 6.0:1.0:2.5 to 5.0.

In all events, however, the alkali metal oxide must always be present in stoichiometric excess with respect to $SiO_2$.

It has further been found that the smaller the excess and concentration of alkali metal oxide in the batch, the higher can be the sulfate content in the aluminate solution.

Furthermore, the content of active solid given above is essential for carrying out the process. This is calculated as the sum of alkali metal oxide, $Al_2O_3$ and $SiO_2$ in the batch. Sodium sulfate is not included in this case. The active solid content should lie between 10% and 40% by weight. Preferably the process is carried out with an active solid content of between 12% and 30% by weight.

The step of conversion to crystalline form has proved to be a specially important factor when conducted in the presence of sulfates. This step should not exceed 10, preferably 8, hours and should be carried out at elevated temperatures. In order to obtain the molecular sieve Type A, crystallization conversion temperatures between 40° C and 110° C were found suitable, and for molecular sieve Type X crystallization temperatures between 70° C and 120° C were found suitable. It has been found advantageously that when the active solid and sulfate content in the precipitate mixture is higher, the time of crystallization conversion is shortened. With too long a crystallization conversion time, a worsening of the results occurs owing to the formation of less interchangeable products such as feldspathic substances and the like. The optimum crystallization conversion may in some cases even be reached after two hours.

It has been shown that the calcium binding capacity of the alkali metal zeolitic aluminosilicates first rises during crystallization conversion and then falls again after passing through a maximum. The maximum in question depends upon the precipitation mixture and reaction proportions and the technical carrying out of the process. The point of maximum calcium binding capacity during the crystallization conversion can be easily and reproducibly found by sampling. The crystallization conversion is discontinued on reaching the maximum calcium binding capacity. Preferably the calcium binding power is at least 100 mg CaO/gm of active substance. The mixture is cooled and the solid is separated. If it is desired according to the proposed use, the solid is washed free from alkali and dried.

The calcium binding capacity or power is an important quantifiable molecular sieve property. It can be determined as follows:

200 ml of a solution of 30° German hardness (300 mg CaO/liter, corresponding to 0.594 gm of $CaCl_2$ per liter) are adjusted to a pH value of 10 with dilute caustic soda and mixed with 0.2 gm of the product to be tested (based on the anhydrous alkali metal aluminosilicate, AS). Then the suspension is vigorously stirred for 15 minutes at room temperature (22° ± 2° C). After filtering off the solid, the residual hardness $x$ in 100 ml of filtrate is determined. From this, the calcium binding capacity or power in mg CaO/gm of active substance according to the formula $(30 - x) \cdot 10$, is calculated.

The present invention will now be further illustrated by way of the following examples which are not limitative.

EXAMPLE 1

3200 gm of a pickling liquor, which contains 4.8% of $Al_2O_3$, 6.3% of $Na_2O$ and 6.6% of $Na_2SO_4$, were mixed at 40° C while stirring with 607 gm of a sodium waterglass (26.9% $SiO_2$ and 8.0% $Na_2O$). The resulting molar ratio in the precipitation mixture was 2.7 $Na_2O$ : 1.0 $Al_2O_3$ : 1.8 $SiO_2$ : 1.0 $Na_2SO_4$ and it contained 15% active solids.

An amorphous sodium aluminosilicate was precipitated. The suspension of the precipitate in the reaction media was homogenized for 20 minutes with a high speed stirrer (1000 to 3000 revolutions per minute) while heating at 90° C. Thereafter the conversion to a crystalline material was completed by heating for six hours at 90° C without stirring. After the crystallization conversion was completed, the product was separated, washed largely free from alkali (until the pH value of the wash water is 9 to 10) and dried at about 100° C.

After working up the product can be identified by means of the X-ray diffraction diagram as a highly crystalline molecular sieve of Type A. Mixtures of nosean or other feldspathic materials or other sodium aluminosilicates were not recognizable. The calcium binding capacity of the product is 140 mg CaO/gm of active substance.

If, instead of the sodium silicate solution, an equivalent amount of potassium silicate solution was used with otherwise the same method of operation, the corresponding zeolitic potassium sodium aluminosilicate was obtained.

EXAMPLE 2

By use of 3480 gm of a pickling liquor with 4.4% of $Al_2O_3$, 7.2% of $Na_2O$ and 6.1% of $Na_2SO_4$ as well as 607 gm of the same sodium silicate solution as in Example 1, molecular ratios of the precipitation mixture of 3.2 $Na_2O$ : 1.0 $Al_2O_3$ : 1.8 $SiO_2$ : 1.0 $Na_2SO_4$ (15% active solid) were obtained. With further proceeding as in Example 1, a product with a somewhat lower calcium binding capacity (120 mg CaO/gm of active substance) was obtained, which also had no impurities.

EXAMPLE 3

By use of 1840 gm of a pickling liquor with 8.3% of $Al_2O_3$, 13.5% of $Na_2O$ and 5.8% $Na_2SO_4$ as well as a sodium silicate solution, a molar ratio of 3.2 $Na_2O$ : 1.0 $Al_2O_3$ : 1.8 $SiO_2$ : 0.5 $Na_2SO_4$ for the precipitation mixture with a greatly increased active solids concentration of 25% was obtained. With otherwise the same proceeding as in Example 1, the crystallization conversion must be discontinued after four hours at the latest. The highly crystalline pure molecular sieve of Type A thus obtained has a calcium binding capacity of 130 mg CaO/gm of active substance.

If the crystallization is extended for only about two more hours, a mixed product results which only contains up to about a half of a molecular sive of Type A together with nosean and other impurities.

When the above precipitation mixture ratios were retained with a small sulfate content corresponding to 0.1 $Na_2SO_4$ (only 1.2% $Na_2SO_4$ in the pickling liquor) there were obtained in almost 100% yields, exclusively nosean, or other feldspathic substances with the same X-ray diffraction diagram when the crystallization conversion was extended to 24 hours.

EXAMPLE 4

2930 gm of pickling liquor with 5.2% $Al_2O_3$, 6.4% $Na_2O$ and 7.3% $Na_2SO_4$ were mixed according to Example 1 with 334 gm of waterglass (resulting molar ratio of the precipitation mixture, 2.3 $Na_2O$ : 1.0 $Al_2O_3$ : 1.0 $SiO_2$ : 1.0 $Na_2SO_4$ with 14% active solid). On further proceeding as in Example 1 a pure molecular sieve of Type A free from nosean with a calcium binding capacity of 130 mg CaO/gm of active substance was obtained,.

EXAMPLE 5

1280 gm of pickling liquor with 8.0% $Al_2O_3$, 15.2% $Na_2O$ and 11.2% $Na_2SO_4$ were diluted with a further 1280 gm of deionized water and mixed with 670 gm of waterglass. A molar ratio of the precipitation mixture of 4.0 $Na_2O$ : 1.0 $Al_2O_3$ : 3.0 $SiO_2$ : 1.0 $Na_2SO_4$ with 16% of active solid was obtained. The precipitate was homogenized as in Example 1. After two hours of crystallization conversion at 110° C in a nickel autoclave, highly crystalline molecular sieve of Type X free of nosean and with a calcium binding capacity of 130 mg CaO/gm active substance was obtained.

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. A process for the production of zeolitic alkali metal aluminosilicates from alkali metal aluminate solutions containing alkali metal sulfate impurities consisting essentially of the steps of
   a. mixing an aqueous alkali metal silicate solution with an aqueous alkali metal aluminate solution
      1. containing an alkali metal sulfate having a molar ratio of $Al_2O_3$ to sulfate of 1:0.35 to 1.25 under agitation at a precipitation temperature of from 0° C to 110° C,
      2. in such amounts that the resulting mixture has a molar ratio of alkali oxide : $Al_2O_3$ : $SiO_2$ of 1.5 to 6.0:1.0:1 to 5.0, wherein
      3. the alkali metal oxide is present in a stoichiometric excess with respect to $SiO_2$,
      4. the excess of alkali metal oxide over unity as well as the alkali metal oxide concentration is decreased when the sulfate content is increased, and
      5. the alkali metal oxide : $Al_2O_3$ : $SiO_2$ solids content of the resultant aqueous mixture is maintained between 10% to 40% by weight,
   b. subjecting the aqueous precipitate to a homogenization by application of shearing forces,
   c. converting the amorphous homogenized slurry to a crystalline state by maintaining the slurry at a crystallization temperature of between about 40° C and 120° C,
   d. determining the calcium binding power of the crystalline aluminosilicate formed, and
   e. (6) discontinuing the conversion step (c) by cooling and separating the crystalline aluminosilicate when substantially the optimum calcium binding power is attained.

2. The process of claim 1 wherein the molar ratio of $Al_2O_3$ to sulfate is substantially 1.

3. The process of claim 1 wherein said resulting mixture has a molar ratio of alkali metal oxide : $Al_2O_3$ : $SiO_2$ of 2.0 to 3.5:1.0:1.0 to 3.0.

4. The process of claim 1 wherein said resulting mixture has a molar ratio of alkali metal oxide : $Al_2O_3$ : $SiO_2$ of 3.0 to 6.0:1.0:2.5 to 5.0.

5. The process of claim 1 wherein said alkali metal oxide : $Al_2O_3$ : $SiO_2$ solids content is maintained between 12% and 30% by weight.

6. The process of claim 1 wherein said conversion step (c) to a crystalline state at a crystallization temperature is conducted for up to ten hours.

7. The process of claim 1 wherein said conversion step (c) to a crystalline state at a crystallization temperature is conducted for up to eight hours.

8. The process of claim 1 wherein the optimum calcium binding power is at least 100 mg CaO/gm of active substance.

* * * * *